W. J. GELINK.
FERTILIZER DISTRIBUTING ATTACHMENT.
APPLICATION FILED SEPT. 9, 1913.
1,117,028.
Patented Nov. 10, 1914.
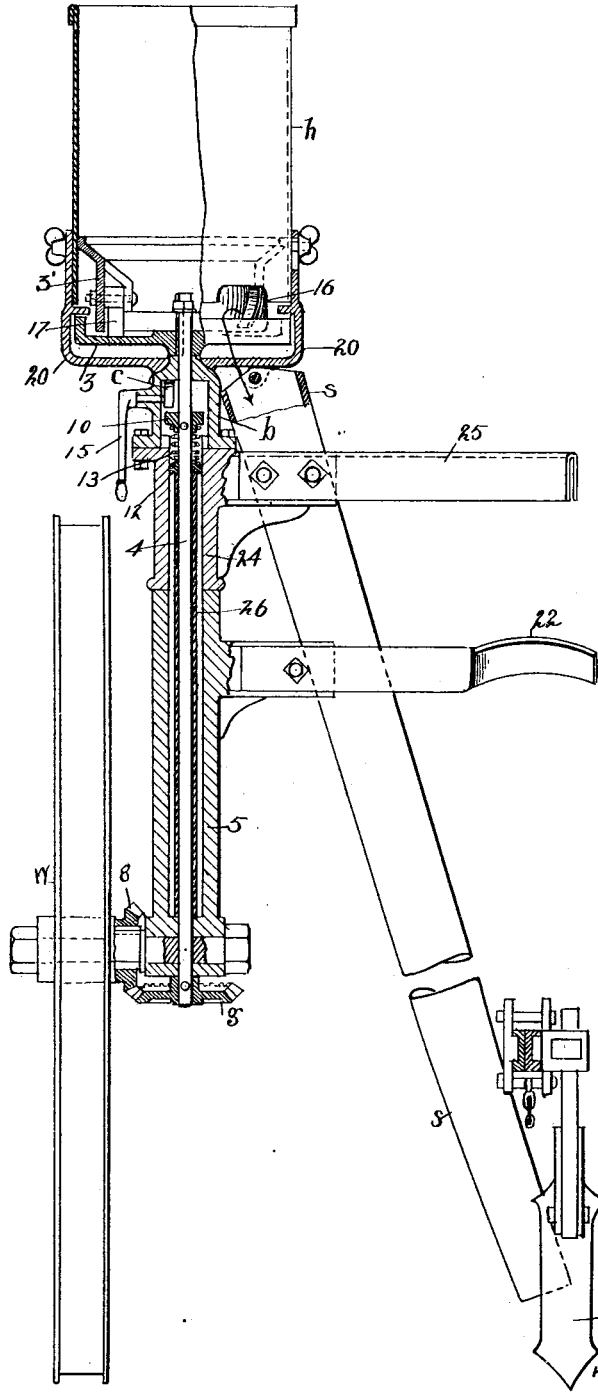
ATTEST
INVENTOR
WILLIAM J. GELINK
By
Fisher & ___ ATTYS

UNITED STATES PATENT OFFICE.

WILLIAM J. GELINK, OF AKRON, OHIO, ASSIGNOR TO THE AKRON CULTIVATOR COMPANY, OF AKRON, OHIO, A CORPORATION.

FERTILIZER-DISTRIBUTING ATTACHMENT.

1,117,028. Specification of Letters Patent. Patented Nov. 10, 1914.

Application filed September 9, 1913. Serial No. 788,906.

*To all whom it may concern:*

Be it known that I, WILLIAM J. GELINK, citizen of the United States, residing at Akron, in the county of Summit and State of Ohio, have invented certain new and useful Improvements in Fertilizer-Distributing Attachments, of which the following is a specification.

The invention shown in the single figure herewith consists in an improvement in fertilizer distributing attachments for sulky cultivators, and the object of the invention is to provide an attachment which is adapted to be located on and operatively connected up with a sulky or riding cultivator having wheels as usual and straddle row gangs of teeth adapted to cultivate on both sides of a row at the same time and by means of the attachment described to drill or distribute the fertilizer as near to plants as may seem desirable and to deliver the same to the ground in front of one or the other teeth in a gang or immediately behind the same and where the earth will roll inward and more or less completely cover the fertilizer.

In the present application the invention resides more particularly in the transmission means which operatively connect the distributing mechanism with the drive mechanism on the respective wheels, it being understood that the mechanism is simply duplicated as to the respective sides of the machine if fertilizer is to be applied on both sides of a row, as usually is the case, because this furnishes plant food on both sides and insures uniform growth of the plant. Usually when the plants are young, as in the case of corn, the fertilizer distributing or delivery spout S is placed to feed in conjunction with the front and inner gang tooth T, the others being broken away in the view shown, but when the corn has grown larger it is found a good practice to apply the fertilizer in connection with one of the teeth which run more nearly toward the middle of the space between rows, it being of course understood that a more or less refined commercial fertilizer is employed and which will feed satisfactorily by the present means.

The immediate feed mechanism as such is located in the receptacle $h$ which has a funnel-shaped bottom 3 splined or otherwise fixed on the rotatable shaft 4 and adapted to be rotated thereby to promote the feed of the fertilizer from the said receptacle to the delivery spout S. The said shaft 4 is projected down through the tubular standard 5 of the cultivator frame and has a bevel gear $g$ fixed upon its lower end. The said standard has a transverse bore at its bottom and the wheel spindle 6 is secured therein. A bevel or miter gear 8 on the hub of the wheel $w$ on said spindle meshes with gear $g$ and thus the said bottom 3 is rotated as described. The said shaft 4 is axially adjustable within limits and serves as a medium for throwing the said gear $g$ out of mesh with the drive gear 8 on the wheel hub when for any reason it is desirable to disengage said parts and suspend the operation of the fertilizer attachment. To this end the shaft 4 is slidable within limits in the bottom 3 and carries a collar 10 fixed thereon while a thimble 12 fixed rigidly in the upper portion of the frame standard 5 serves as a seat for a spiral spring 13 about said shaft and which rests on said seat 12 and exerts a normal upward lift against the collar 10 to raise said shaft and its gear $g$ into working relations. A bracket $b$ is seated on the cultivator frame immediately over the post 5 and the said collar comes therein and also a cam $c$ which is carried by a hand controlled crank 15 supported in said bracket and adapted to rotate said cam and depress said collar and shaft and disengage gear $g$. On the other hand when the said crank and cam are in normal position as shown the said gears are in working engagement.

The casting 3' serves as a hopper for the bottom 3, and said bottom stands apart from said casting at its upturned edge and at the bottom thereof so that the fertilizer can work out beneath the casting into the space between said parts and from which it is lifted into the end of the spout S by the so-called plow 16. The said plow is fixed on the outer portion of the hopper 3' in the space between the same and the rim of the bottom over which the fertilizer is fed into said spout, while an agitator 17 is fixed on the inside of said hopper to stir the fertilizer therein.

Arms 20 rigid with bracket $b$ serve as supports for receptacle $h$, and the spout S is secured to one of these arms and necessarily is laterally inclined downward to reach over to the inner cultivator tooth. Probably it should also be observed that this cultivator is of the pivot axle type and that the standard 5 is in fact in two parts or sections, the lower part having a foot lever 22 on its inner side and the upper part 24 built in rigidly with the cross connection 25 of the cultivator frame. In this instance an inner unifying tube or pipe 26 extends the full length of the said standard and has the thimble 12 resting thereon. This leaves the lower section 5 of said standard free to be rotated through foot lever 22. An equivalent construction to the foregoing would be to provide either the lower or the upper section of the said standard with a tubular extension socketed in the opposite section and which would render the extra internal pipe 26 unnecessary.

What I claim is:

1. A sulky cultivator having a vertically disposed tubular standard comprising a fixed upper section and a rotatable lower section and a wheel mounted on said lower section, in combination with fertilizer distributing mechanism seated over said standard, a gear on said wheel and a drive shaft through said standard engaged by said gear and operatively connected with said distributing mechanism.

2. A sulky cultivator having a supporting frame comprising a tubular standard having a fixed upper section and a rotatable lower section provided with a foot lever to control the same and a wheel mounted on said lower section having a bevel gear on the hub thereof, in combination with a fertilizer distributer supported on said standard having a rotatable bottom and a shaft through said standard operatively engaged with said gear and said bottom at its respective ends.

3. A sulky cultivator having a fertilizer distributer mounted over the side thereof and provided with a rotatable bottom, a drive shaft for said bottom slidable therein, means to actuate said drive shaft and a spring on said shaft to hold it in driving relations and means to depress said shaft as against said spring to release it from driving connections.

4. A sulky cultivator having a tubular side standard and a carrying wheel mounted thereon having a gear on the hub thereof, in combination with a fertilizer distributer over said standard having a rotatable bottom, a shaft through said standard having a gear in mesh with the gear on said hub and slidable in said bottom, a spiral spring about said shaft adapted to lift said shaft and maintain engagement of said gears, a collar on said shaft and a device to engage and depress the same and cause disengagement of said gears.

In testimony whereof I affix my signature in presence of two witnesses.

WILLIAM J. GELINK.

Witnesses.
H. B. FITCH,
L. B. FRISCH.

Copies of this patent may be obtained for five cents each, by addressing the "Commissioner of Patents, Washington, D. C."